US010972469B2

(12) United States Patent
Raman et al.

(10) Patent No.: US 10,972,469 B2
(45) Date of Patent: Apr. 6, 2021

(54) PROTECTING CRITICAL DATA AND APPLICATION EXECUTION FROM BRUTE FORCE ATTACKS

(71) Applicant: Honeywell International Inc., Morris Plains, NJ (US)

(72) Inventors: Venkat Raman, Bangalore (IN); Chandrakanth Vittal, Bangalore (IN)

(73) Assignee: Honeywell International, Inc., Charlotte, NC (US)

( * ) Notice: Subject to any disclaimer, the term of this patent is extended or adjusted under 35 U.S.C. 154(b) by 216 days.

(21) Appl. No.: 15/944,575

(22) Filed: Apr. 3, 2018

(65) Prior Publication Data

US 2019/0306168 A1    Oct. 3, 2019

(51) Int. Cl.
*H04L 29/06* (2006.01)

(52) U.S. Cl.
CPC ........ *H04L 63/101* (2013.01); *H04L 63/0428* (2013.01); *H04L 63/1466* (2013.01)

(58) Field of Classification Search
CPC ...... G06F 21/60; G06F 21/62; G06F 21/6209; H04L 63/10; H04L 63/101; H04L 63/0428; H04L 63/1466
See application file for complete search history.

(56) References Cited

U.S. PATENT DOCUMENTS

| | | | | |
|---|---|---|---|---|
| 6,314,408 B1 * | 11/2001 | Salas | ..................... | G06F 16/958 705/54 |
| 9,037,608 B1 * | 5/2015 | Sobel | ................ | G06F 16/90344 707/783 |
| 9,390,263 B2 * | 7/2016 | Thomas | .............. | H04L 63/1408 |
| 9,449,007 B1 * | 9/2016 | Wood | ..................... | G06F 16/164 |
| 9,514,324 B1 * | 12/2016 | Potlapally | ............... | H04L 63/10 |
| 9,824,315 B2 * | 11/2017 | Goossen | ................ | G06Q 10/06 |
| 10,148,637 B2 * | 12/2018 | Taralika | .................. | H04L 63/08 |
| 10,540,509 B2 * | 1/2020 | Ashkenazi | ............. | G06F 21/56 |
| 2002/0123981 A1 * | 9/2002 | Baba | ....................... | G06F 9/468 |
| 2006/0174334 A1 * | 8/2006 | Perlin | ................. | G06F 21/6218 726/9 |
| 2006/0230454 A1 * | 10/2006 | Achanta | ................ | G06F 21/566 726/24 |
| 2008/0109679 A1 * | 5/2008 | Wright | ................. | H04L 63/102 714/37 |

(Continued)

OTHER PUBLICATIONS

"OllyDbg", Wikipedia, Jan. 2, 2018, 2 pages.
"Brute-force attack", Wikipedia, Mar. 19, 2018, 7 pages.
"Digital signature", Wikipedia, Mar. 26, 2018, 12 pages.

*Primary Examiner* — Khang Do
(74) *Attorney, Agent, or Firm* — Seager, Tufte & Wickhem, LLP (57) ABSTRACT

A method, an electronic device, a computer readable medium is disclosed. The method includes modifying a header of an object to include a list of applications or files. The method also includes responsive to an application attempting to access the object, interrupting access to the object. The method further includes determining whether the application that is attempting to access the object is approved based on identifying at least one application or file included in the list of the modified header that corresponds to the application. The method also includes preventing the application from accessing the object when it is determined that the application is not included in the list of the modified header.

17 Claims, 6 Drawing Sheets

(56) References Cited

U.S. PATENT DOCUMENTS

| | | | |
|---|---|---|---|
| 2008/0177994 A1* | 7/2008 | Mayer | G06F 9/4418 |
| | | | 713/2 |
| 2009/0222903 A1* | 9/2009 | Sherkin | G06F 21/335 |
| | | | 726/10 |
| 2010/0070775 A1* | 3/2010 | Dik | G06F 21/645 |
| | | | 713/187 |
| 2010/0192227 A1* | 7/2010 | Dai | G06F 16/2315 |
| | | | 726/24 |
| 2014/0007184 A1* | 1/2014 | Porras | G06F 21/53 |
| | | | 726/1 |
| 2016/0283406 A1* | 9/2016 | Linga | G06F 16/93 |
| 2019/0109852 A1* | 4/2019 | Ranganathan | H04L 63/104 |
| 2019/0236292 A1* | 8/2019 | Bartolotta | G06F 8/65 |

\* cited by examiner

PROTECTING CRITICAL DATA AND APPLICATION EXECUTION FROM BRUTE FORCE ATTACKS

TECHNICAL FIELD

This disclosure relates generally to computing security. More specifically, this disclosure relates to an apparatus and method to protect electronic data, applications, and files from unauthorized access.

BACKGROUND

Numerous organizations have private computing networks that support some type of access controls or other cyber-security controls to limit access to particular files and programs. This is necessary in protected environments such as industrial control systems, manufacturing plants or other facilities, hospitals or other healthcare facilities, classified network areas, as well as in commercial and private use. As a particular example, industrial processes are often managed using industrial process control and automation systems. Control and automation systems can include a variety of networked devices, such as servers, workstations, switches, routers, firewalls, safety systems, proprietary real-time controllers, and industrial field devices. Often times, this equipment comes from a number of different vendors. Cyber-security is of increasing concern, and unaddressed security vulnerabilities in any of these components could be exploited by malicious actors to disrupt operations or cause unsafe conditions in an industrial facility. In another example, in a commercial or business setting, multiple computing devices, such as computers, servers, portable electronic devices such as smart phones, and the like, are connected over a network and are capable of providing access of various files and applications to a multitude of personnel. Such systems generally have a variety of firewalls, safety systems, such as user authentication parameters. However firewalls and user authentication parameters can still be susceptible be attacks, and data theft.

Unfortunately, malicious actors continue to leverage new technologies to exploit weaknesses, and cyber-security solutions (such as antivirus solutions and firewall solutions) often cannot keep pace with new threats. For example, antivirus solutions can often only protect against threats already known and catalogued in their signature databases. As another example, firewalls are often only as effective as their configurations and technology stacks enable them to be. As a result, it is becoming increasingly difficult for organizations to rely on cyber-security solutions to protect their networks and systems from intrusions or other exploits.

SUMMARY

This disclosure provides an apparatus and method for automatic contextualization and issue resolution related to an industrial process control and automation system.

In a first embodiment, a method for protecting data is provided. The method includes modifying a header of an object to include a list of applications or files. The method also includes interrupting access to the object in response to an application attempting to access the object. The method further includes determining whether the application that is attempting to access the object is approved, based on identifying at least one application or file included in the list of the modified header that corresponds to the application. The method also includes preventing the application from accessing the object when it is determined that the application is not included in the list of the modified header.

In a second embodiment, an electronic device is provided. The electronic device includes a memory and a processor. The memory is configured to store an object. The processor is configured to modify a header of the object to include a list of applications or files. The processor is also configured to interrupt access to the object in response to an application attempting to access the object. The processor is further configured to determine whether the application that is attempting to access the object is approved, based on at least a portion of the obtained information within modified header of the object. The processor is also configured to prevent the application from accessing the object when it is determined that the application is not identified in the modified header.

In a third embodiment, a non-transitory computer readable medium is provided. The non-transitory computer readable medium embodying a computer program, the computer program comprising computer readable program code that when executed by a processor of an electronic device causes processor to: modify a header of an object to include a list of applications or files; responsive to an application attempting to access the object, interrupt access to the object; determine whether the application that is attempting to access the object is approved, based on identifying at least one application or file included in the list of the modified header that corresponds to the application; and prevent the application from accessing the object when it is determined that the application is not included in the list of the modified header.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

As noted above, numerous organizations have private computing networks that support some type of access controls or other cyber-security controls to limit access. Unfortunately, malicious actors continue to leverage new technologies to exploit weaknesses, and cyber-security solutions (such as antivirus solutions and firewall solutions) often cannot keep pace with new threats. As a result, additional cyber-security solutions are needed to protect network infrastructures and confidential information. Moreover, it is becoming apparent that cyber-security cannot be achieved by implementing a single product or adhering to a single process. Rather, additional levels of cyber-security can be achieved by creating and implementing a stamper or detector or both. The stamper can be associated with each file or programs that are to be protected. Once implemented, security mitigations typically need to continue to be assessed against the current threat landscape in order to stay relevant.

This disclosure describes techniques for verifying whether a particular program is a valid program for accessing particular file, application, or program. For example, when a person accesses a particular file, application or program on a regular basis inputting an authentication parameter such as a password is often tedious and the authentication parameter can be 'cracked' by a malicious actor.

One common type of attack is a brute force attack, also known as brute force cracking by a brute force attack program. A brute force attack is a trial and error method used by application programs to decode encrypted data such as passwords or Data Encryption Standard (DES) keys, through exhaustive effort (using brute force) rather than employing intellectual strategies. For example, just as a criminal might break into, or "crack" a safe by trying many possible combinations, a brute force cracking application proceeds through all possible combinations of legal characters in sequence. Brute force is considered to be an infallible, although time-consuming, approach User authentication parameters such as credentials or passwords can be used to ensure that users are permitted to access computing or networking resources, and the use of credentials as a mechanism for authorization is ubiquitous. However, user authentication parameters compromise remains one of the most prevalent tactics of malicious actors, to gain access to protected files, applications or programs. For example, a brute force attack merely tries to crack the password or credentials in order to circumvent the required credentials and access the file or execute program.

For example, a malicious actor such as a hacker can inject application that uses various brute force techniques to break into applications or files by loading a target application or the target file into a targeted computing device where to perform a brute force attack to extract critical information from the targeted computing device. For instance, an authentication parameter can be 'cracked' by a program that is referred to as a brute force attack program. A brute force attack program is inputted into a networked computing device, and via trial and error, numerous combinations of character strings are inputted until the correct password is achieved and access to the targeted file, application, or program is granted. A brute force attack generally performs an exhaustive effort of trial and error rather than employing an intellectual strategy of accessing the file. Generally files, applications, or programs protected by user authentication parameters such as a password are susceptible to brute force attacks. For example, the brute force attack program can eventually 'crack' the authentication parameter and thereafter provide access of the targeted file, application, or program to the malicious file, application, or program attacked malicious actor. In another example, a debugger called OLLYDBG can be used as a reverse engineering tool, or a binary code analyzer. OLLYDBG is widely used by both security personnel and hackers, as it is useful when the source code is not available, and can thereby provide access to files, applications, or programs even when the files, applications, or programs are protected by various user authentication parameters.

One common type of attack can occur when a malicious actor gains access to a device or system. The malicious actor can gain access to a device or system by determining the credentials of authorized user by employing a brute force attack. Credentials can be used to ensure that only specific users are permitted to access various computing or networking resources. Once a malicious actor gains access to a device or system the malicious actor can gain access to programs or files that are prohibited to the specific actor.

Various files or applications can be opened by numerous programs. As a result, once the brute force attack program cracks the user authentication parameters that are used to protect the file, application, or program, the brute force attack program can access the protected information, meaning that any rouge application can load any documents, for the purpose of stealing sensitive information by password cracking, reverse engineering and the like.

Accordingly, embodiments of the present disclosure provide a solution that disallows and prevents malicious applications from loading the targeted files, applications, or programs in order to circumvent a brute force attack. For example, to evade a brute force attack, solutions are provided in this disclosure that prevents unauthorized applications (such as those that perform brute force attacks) from loading a targeted file, application, or program into the processes of a brute force attack type program. For example, according to embodiments of the present disclosure, any application that attempts to conduct a brute force attack is prevented from accessing (such as loading the file or executing the program) the file, application, or program.

As described in more detail below, one or more components are used to detect whether an active user session is an authorized user or whether files or program are accessed as a result of a successful brute force attack. The components disclosed herein are a stamper and a detector. The stamper modifies or augments the file or program header by adding two types of data, based on obtained information that is known to be valid. The first is a file type, the second is a specific type of program that can access the file. For example, if a particular file can only be opened or accessed by a specific program, then the program performing a brute force attack is prevented from opening the file or program, regardless if the user authentication parameters or credentials are hacked. The detector is a service that runs on the background on each end user device. The detector is responsible for monitoring each protected file or program. As a result, when a protected file is initially accessed by the file loader component of the computing device, the detector analyzes the header of the protected file or program and identifies the type of program attempting to access the protected file or program. The detector either grants access or denies access based on the modified header of the protected file or program.

As described in more detail below, one or more components of a computing system can be used to detect when a protected file is being accessed (such as by an application). Additionally, one or more components of a computing system can identify a parameter associated with the application that is attempting to access a protected file. Thereafter, one or more components of a computing system can determine whether the specific application is identified in the header of a protected file. If the particular application is not identified in the header of the protected file, then the file or program is prevented from opening or accessing the protected file. If the particular application is identified in the header of the protected file, then the file or program is granted permission to access the protected file.

Figure 1:
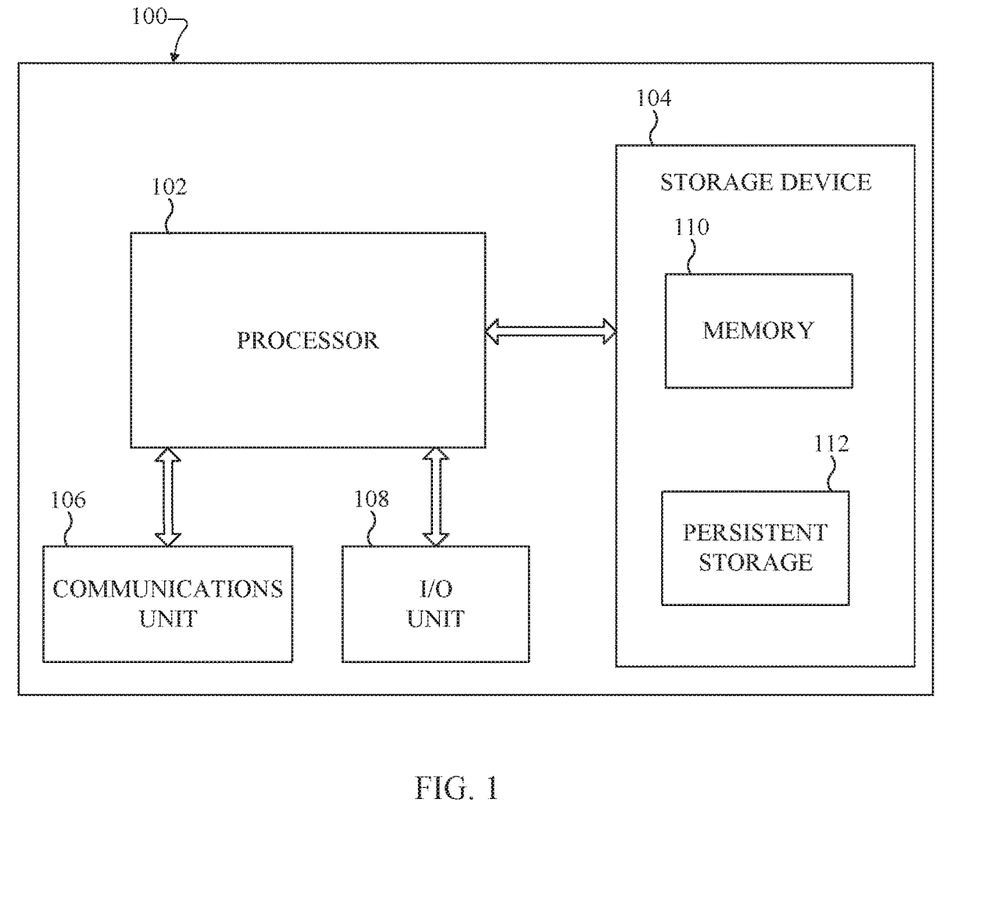
FIG. 1 illustrates example devices for user verification according to this disclosure.

FIG. 1 illustrates an example device for authenticating a program based on user interactions according to this disclosure. In particular, FIG. 1 illustrates an example computing device 100. In some embodiments, the computing device 100 could denote a server, a remote server, a computing device, a mobile device, or the like. The computing device 100 could be used to run applications. The computing device 100 could be used to perform one or more of functions.

As shown in FIG. 1, the computing device 100 includes at least one processor 102, at least one storage device 104, at least one communications unit 106, and at least one input/output (I/O) unit 108. Each processor 102 can execute instructions, such as those that may be loaded into a memory 110. Each processor 102 denotes any suitable processing device, such as one or more microprocessors, microcontrollers, digital signal processors, application specific integrated circuits (ASICs), field programmable gate arrays (FPGAs), or discrete circuitry.

The memory 110 and a persistent storage 112 are examples of storage device 104, which represent any structure(s) configured to store and facilitate retrieval of information (such as data, program code, and/or other suitable information on a temporary or permanent basis). The memory 110 may represent a random access memory or any other suitable volatile or non-volatile storage device(s). The persistent storage 112 may contain one or more components or devices supporting longer-term storage of data, such as a read-only memory, hard drive, flash memory, or optical disc.

The communications unit 106 supports communications with other systems or devices. For example, the communications unit 106 could include at least one network interface card or wireless transceiver facilitating communications over at least one wired or wireless network. The communications unit 106 may support communications through any suitable physical or wireless communication link(s).

The I/O unit 108 allows for input and output of data. For example, the I/O unit 108 may provide a connection for user input through a keyboard, mouse, keypad, touchscreen, or other suitable input device. The I/O unit 108 may also send output to a display, printer, or other suitable output device.

Although FIG. 1 illustrates example computing device 100 for capable of preventing unauthorized access to particular files, as well as detecting when a file is being accessed maliciously, various changes may be made to FIG. 1. For example, various components in FIG. 1 could be combined, further subdivided, or omitted, and additional components could be added according to particular needs. As a particular example, processor 102 can be divided into multiple processors, such as one or more central processing units (CPUs) and one or more graphics processing units (GPUs). Also, computing device 100 can come in a wide variety of configurations, and FIG. 1 does not limit this disclosure to any particular computing device or mobile device.

Figure 2A:
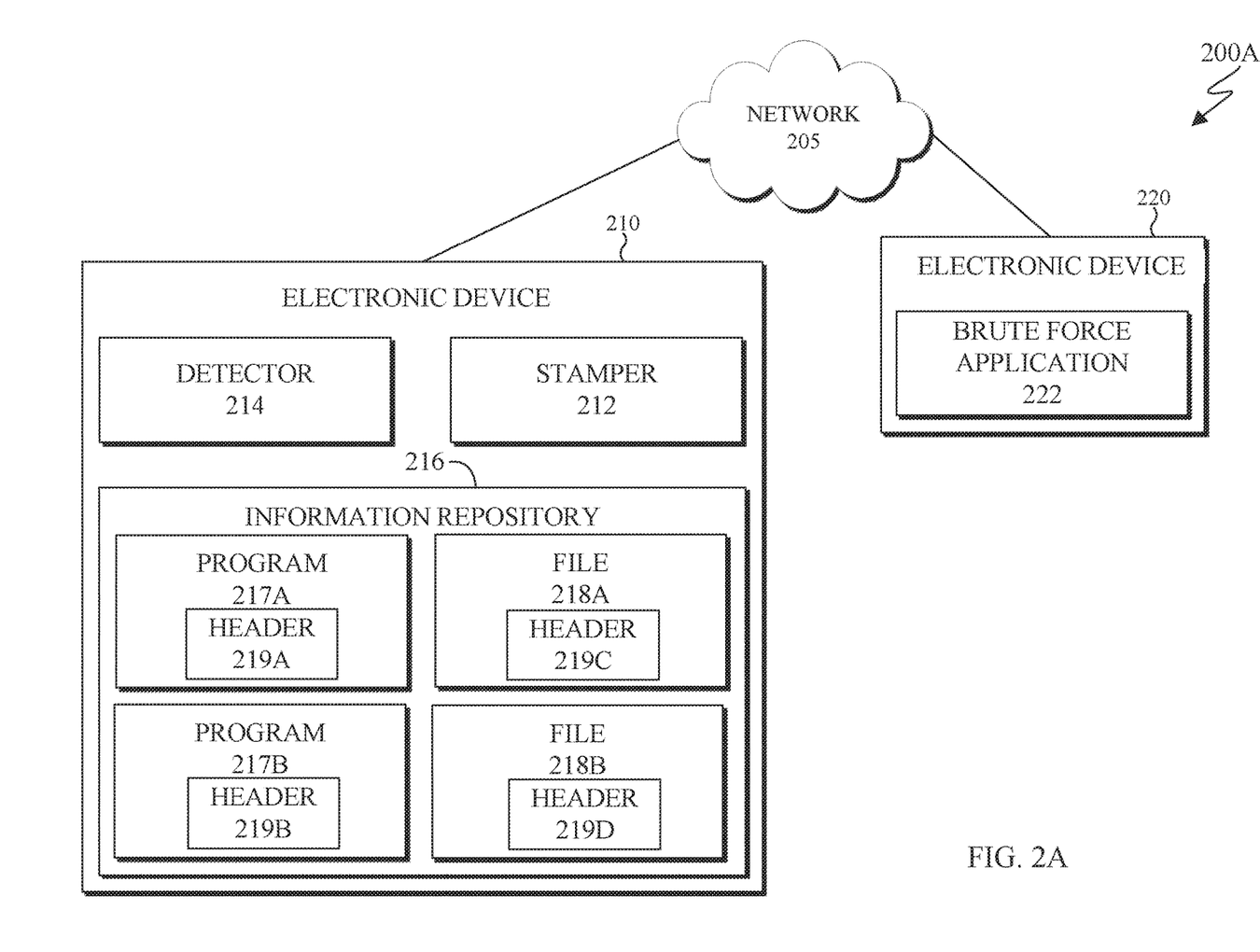
FIGS. 2A and 2B illustrate example block diagrams according to this disclosure.
Figure 2B:
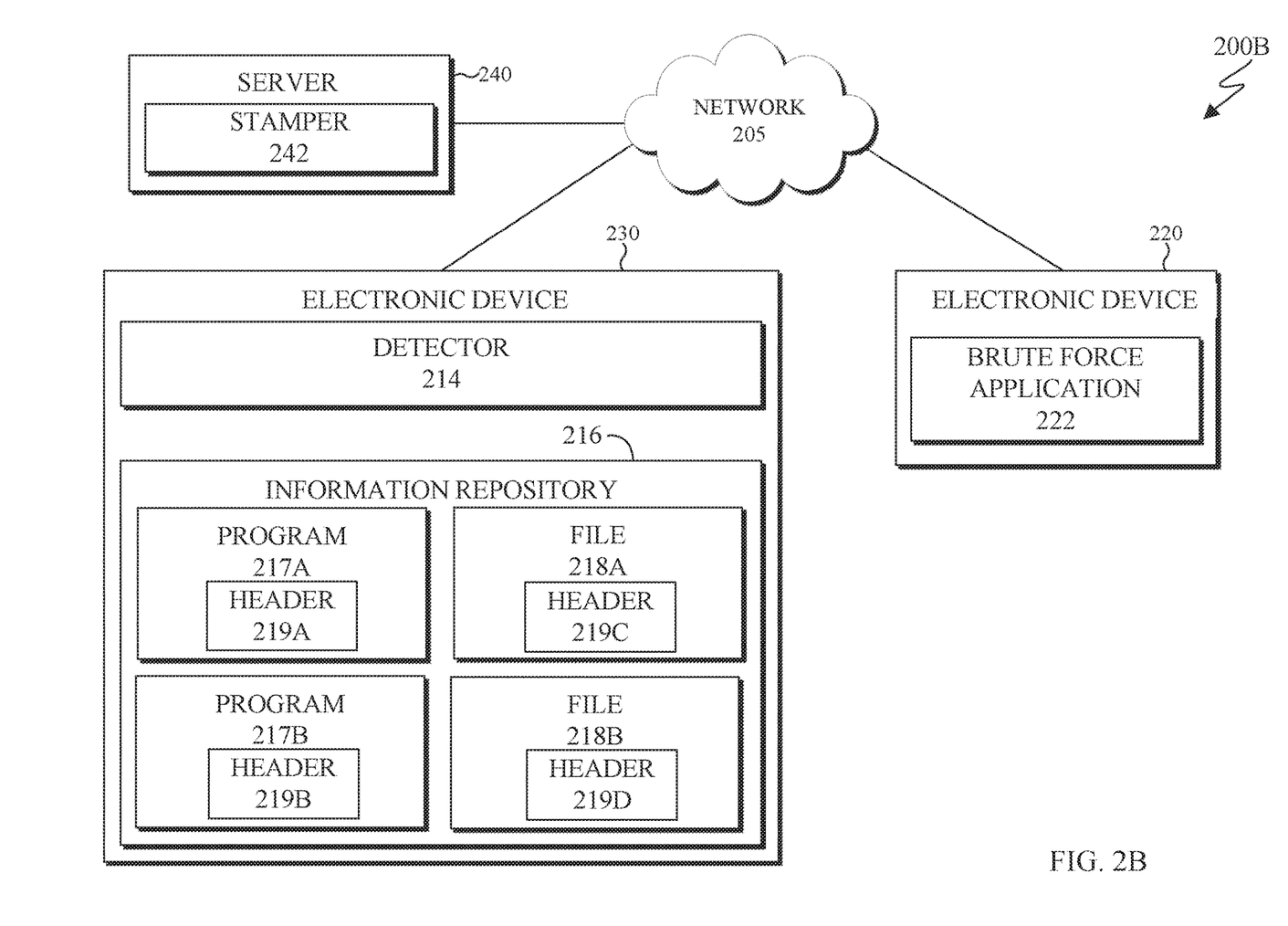

FIGS. 2A and 2B illustrate example block diagrams according to this disclosure. In particular, FIG. 2A illustrates an example high level communication system 200A, and FIG. 2B illustrates an example high level communication system 200B. The embodiment of the communication systems 200A and 200B shown in FIGS. 2A and 2B, respectively, are for illustration only. Other embodiments can be used without departing from the scope of the present disclosure.

Communication system 200A includes an electronic device 210 and an electronic device 220 in communication over network 205. Electronic device 210 and electronic device 220 can be similar to the computing device 100 of FIG. 1.

Network 205 is be used to provide communication between the electronic device 210 and the electronic device 220. Network 205 can be personal area network (PAN), Local Area Networks (LANs), Wireless Local Area Networks (WLANs), the Public Switched Telephone Network (PSTN), as well as other wireless networks. Network 205 may also be the Internet, representing a worldwide collection of networks and gateways that use Transmission Control Protocol/Internet Protocol (TCP/IP) protocols to communicate with one another. Network 205 includes a cable, a router, switches a firewall, or a combination thereof (not depicted). Network 205 can include a variety of connections, such as, wired, wireless or fiber optic connections.

Electronic device 210 is a computing device. Electronic device 210 can be a personal use computing device or a computing device that is part of an organization, such as a business setting. In certain embodiments, electronic device 210 is a server that stores files and programs that other computing devices (not shown) can access. In certain embodiments, electronic device 210 can be in communication with multiple other computing devices (not shown). Electronic device 210 includes a stamper 212, a detector 214, and an information repository 216.

The information repository 216 can be implemented using any architecture known in the art such as, for example, a relational database, an object-oriented database, or one or more tables, or a combination thereof. The information repository 216 stores programs and files, such as program 217A, program 217B, file 218A, and file 218B. The various programs and files stored within the information repository 216 can include confidential information, proprietary information, personal information, various programs, and the like. The information repository 216 can be protected by various user authentication parameters, firewalls, security programs, and the like. The programs and files within the information repository 216 can be accessed by a user via a user input associated with the electronic device 210 or a remote user who accesses the programs and files within the information repository 216 via network 205. While the information repository 216 is depicted in electronic device 210, the information repository 216 can be a server or a remote server or a "cloud" of computers interconnected by one or more networks utilizing clustered computers and components to act as a single pool of seamless resources, accessible to electronic device 210 via network 205.

In certain embodiments, the program 217A is a general program such as a word processing program, such as MICROSOFT WORD, a spreadsheet program such as MICROSOFT EXCEL, a PDF reader, an executable program such as an EXE program, or the like. In certain embodiments, the program 217B is a proprietary program associated with a business or commercial enterprise. It is noted that program 217A, and program 217B can be any type of program running on electronic device 210. In certain embodiments, the file 218A is a general file, such as a word processing file such as DOCX, a spreadsheet file such as XLSX or XML, a PDF file, and the like. In certain embodiments, the file 218B is a proprietary program associated with program 217B. It is noted that file 218A and file 218B can be any type of file type with any file extension running on electronic device 210.

Programs 217A and 217B as well as file 218A and file 218B include header 219A, 219B, 219C, and 219D, respectively. Each header 219A-D, includes general information about the respective file or application. In certain embodiments a file header is metadata contained within the file or application. The metadata can be stored in the start of the file or application, or located in other locations as well. In certain embodiments, headers can be used by an operating system to quickly gather information about a file without loading it all into memory. In certain embodiments headers 219A-D identify the file format, or application type. For example, file headers (219C or 219D) can include metadata about the file and its contents.

Stamper 212 modifies the header (such as header 219A-D) of a particular program, such as program 217A or 217B, or a particular file, such as file 218A or 218B (hereinafter "object"). In certain embodiments, the stamper 212 adjusts the header of a particular object to provide a listing of programs or files that can access the particular object that is to be protected. For example, a user can indicate that file 218A is to be protected and provides the stamper with a list of approved files or programs that can access file 218A.

As shown in communication system 200A, stamper 212 is located within electronic device 210. In certain embodiments, stamper 212 is located on a remote server, such as in communication system 200B. Such embodiments are discussed in further detail below with reference to FIG. 2B.

In certain embodiments, stamper 212 can provide suggestions to the user as to particular files and programs that can access the indicated object to protect. For example, the stamper 212 can generate suggestions based on previous selections by a user. In another example, stamper 212 can generate suggestions based on commonly used programs and files that access the indicated object.

The stamper 212 modifies the header 219A-D of the object during an initial setup as well as when additional files or programs are added to the approved list. For example, when the stamper 212 receives an indication to protect a particular object, the stamper can access the header 219A-D of the indicated object once and the object is protected. In certain embodiments, the stamper 212 can receive an indication to modify a header 219A-D of an object that was previously modified. In this embodiment, the stamper 212 can add or delete specific files or programs that can access the object.

The stamper 212 accesses the header 219A-D of the indicated object and inserts a listing of the indicated programs or files that can access the indicated file. For example, the stamper 212 can use various syntax languages to indicate specific programs or files that can access the object to protect.

As a result of the modified header, even if a brute force attack manages to crack a user authentication parameter associated with a particular object, if the application performing the brute force attack is not included in the approved list, then the brute force attack program cannot access the information.

In certain embodiments, the stamper 212 encrypts the header (such as header 219A-D) of the indicated object. For example, the encryption of the header can be in a proprietary language accessible only by the stamper 212. In another example, information that is modified in the header is encrypted and embedded into the header of the object. In another example the encryption of the header can placing the header of the indicated object as read only. As a result, even if a brute force attack manages cracks a user authentication parameter associated with the object, the brute force attack cannot access nor rewrite the header of the object, as it is read only. Since the header of the object is read only, the brute force attack program is unable to modify the header of the object to include itself as an authorized program to access the object.

The detector 214 detects when an application attempts to access a protected object, and determines to either grant or deny access to the protected object. In certain embodiments, the detector 214 receives a windows kernel message providing an indication that the protected object is being accessed by another process. The process can be any program application or file that attempts to access the protected object. In certain embodiments, the detector 214 continually runs in the background of the electronic device 210 to detect when an application is attempting to access the protected object.

Once the detector 214 determines that an application is attempting to access a protected object, the detector initiates an interrupt to temporarily pause the application from accessing the object. In certain embodiments, the temporary pause lasts only as long as the detector 214 needs to identify the file or program type of the application attempting to access the object and determine whether the file or program type is identified in the header of the object.

The detector 214 determines wither the application that is attempting to access the object is approved based on the information within the header of the object. For example, the detector 214 identifies the file type or program type of the application that is attempting to access the object and attempts to match the identified file type or program type with a file or program type included in the header of the object. That is, the detector 214 verifies that the requesting application is legitimate based on the information within the header of the object.

If the detector 214 determines that the application attempting to access the object is not legitimate, then the detector 214 can deny access to the object. In certain embodiments, the detector 214 can generate a notification to notify a user of the electronic device 210, that a non-approved application is attempting to access a protected object. In certain embodiments, the detector 214 can generate a notification and transmit it to an administrator of the network to notify the administrator that the network 205 connection is not secure.

Electronic device 220 is similar to the electronic device 210 except that the electronic device 220 is attempting to access a program 217A or 217B or file 218A or 218B from electronic device 210. For example, electronic device 220 bypassed any firewalls of network 205 to gain access to the network 205. In another example, electronic device 220 was granted access to network 205 by the network administrator. Electronic device 220 includes a brute force application 222.

The brute force application 222 attempts through trial and error to crack any user authentication parameters associated with a program 217A or 217B or file 218A or 218B from electronic device 210. In certain embodiments, once the brute force attack program cracks any user authentication parameters, the brute force attack program is generally granted to access the targeted object. However, if the targeted object is protected by the stamper 212 and the detector 214, when the brute force application 222 cracks the user authentication parameters associated with the targeted object, the brute force application 222 is prevented from accessing the targeted object.

As illustrated in communication system 200A, stamper 212 is located within electronic device 210. As illustrated in communication system 200B, stamper 242 is located on a remote server. Communication system 200B is identical to communication system 200A except for the location of the stamper (stamper 212 in FIG. 2A and stamper 242 in FIG. 2B). Communication system 200B includes electronic device 230, electronic device 220, and server 240 all in communication over network 205. Electronic device 230 is the same as electronic device 210 except for the absence of stamper 212. Electronic device 220 is the same in both communication system 200A and communication system 200B.

For example, in a business organization, communication system 200A illustrates that each electronic device has the stamper 212 installed locally, whereas communication system 200B illustrates an enterprise system such where server 240 has the stamper 242 installed, and is able to remotely modify the headers of various workstations or connected electronic devices as indicated by a user.

Server 240 can be configured similar to computing device 100 of FIG. 1. Server 240 can be a web server, a server computer such as a management server, or any other electronic computing system capable of sending and receiving data. In certain embodiments, server 240 is a "cloud" of computers interconnected by one or more networks, where server 240 is a computing system utilizing clustered computers and components to act as a single pool of seamless resources when accessed through network 205. Server 240 includes stamper 242. In certain embodiments, stamper 242 is similar to stamper 212 of FIG. 2A. Stamper 242 can access various applications and programs via network 205. For example, server 240 can access any connected electronic device via network 205 and provide the services of stamper 242 to each electronic device as needed. For instance, stamper 242 can access and modify the headers 219A-219D of any indicated program or file on electronic device 230, such as program 217A or file 218A.

Figure 3:
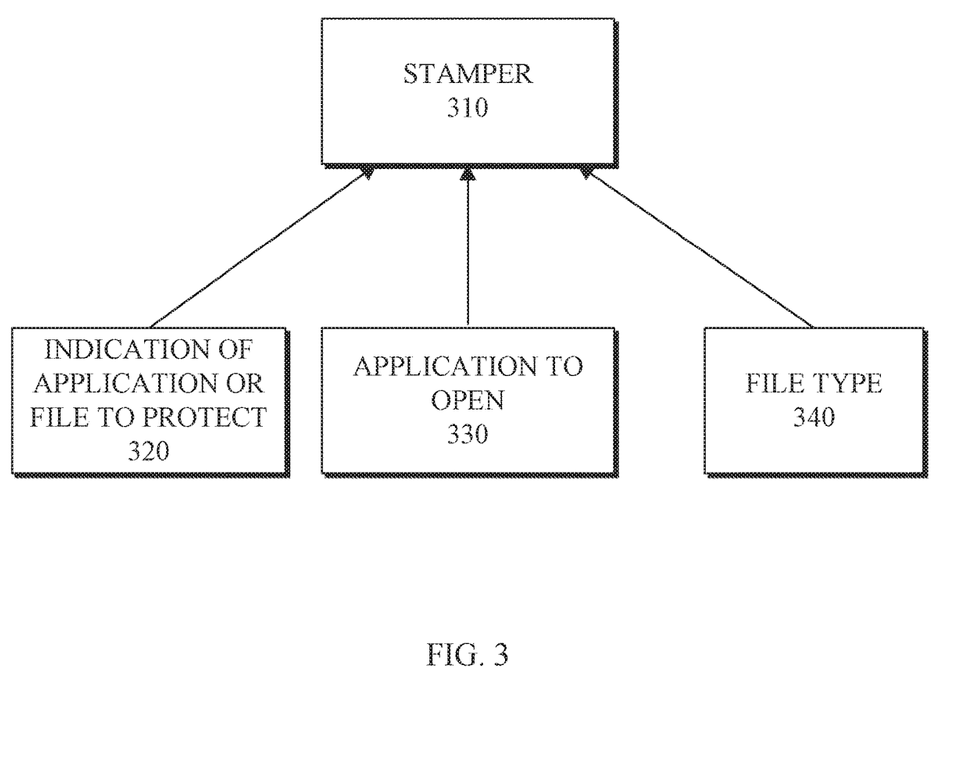
FIG. 3 illustrates an example stamper service for authentication according to this disclosure.

FIG. 3 illustrates example stamper service for authentication according to this disclosure. FIG. 3 illustrates stamper 310 receiving three portions of information. Stamper 310 is similar to stamper 212 of FIG. 2A and stamper 342 of FIG. 2B.

Stamper 310 receives an indication of an application or program to protect the objects indicated in block 320. The indication identifies one or more applications that the stamper 310 is to protect. Stamper 310 also receives a listing of one or more applications that can open the indicated application or files of block 330. Stamper 310 also receives a listing of one or more file types that can open the indicated application or files of block 340. Once the stamper 310 receives the three pieces of data (from blocks 320, 330, and 340), the stamper 310 modifies the header of each identified application (from block 320) to include the information from blocks 330 and 340. Thereafter the identified application or file from block 320 is protected against a brute force attack.

Figure 4:
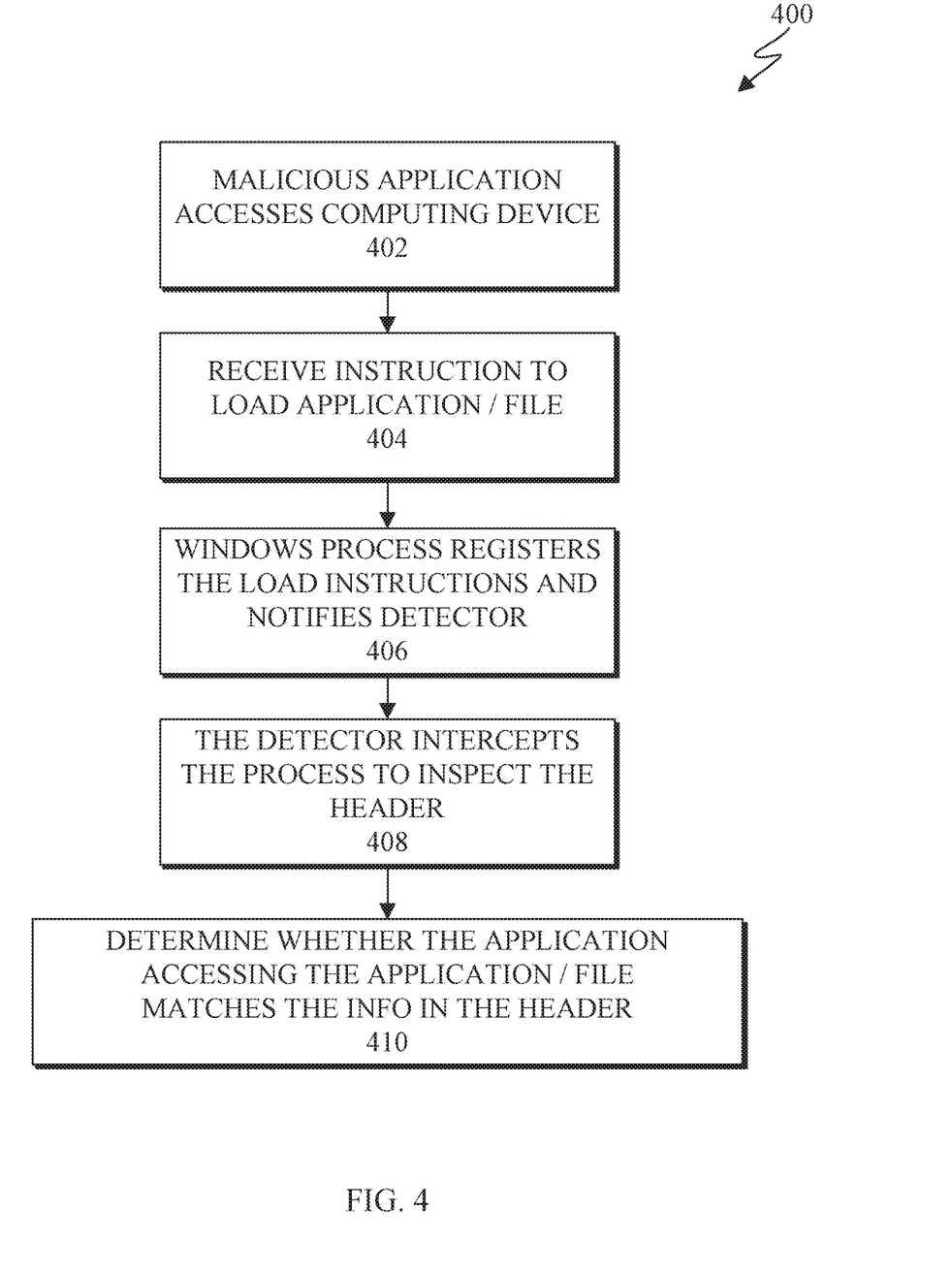
FIG. 4 illustrates an example process of a detector service for authentication according to this disclosure.

FIG. 4 illustrates an example process 400 of a detector service for authentication according to this disclosure. The detector is similar to the detector 214 of FIGS. 2A and 2B. Process 400 is described as implemented by the computing device 100 of FIG. 1, the electronic device 210 of FIG. 2A or the electronic device 230 of FIG. 2B. Process 400 illustrates an example flow of a malicious application gaining access to a computing device, such as electronic device 210 of FIG. 2A, and attempting to gain access to a particular object on the computing device.

At block 402, a malicious application gains access to the electronic device 210. In certain embodiments, the malicious application is a brute force attack program that is capable of cracking any user authentication parameter such as a password associated with a particular file located on the electronic device 210.

At block 404, the malicious application manages to crack the user authentication parameter of a particular file and attempts to access the information within the file. For example, the malicious application attempts to open the file to extract the data within.

At block 406, the electronic device 210 registers that a particular file is being accessed and notifies the detector. For example, a windows kernel messages the detector that a particular file is being accessed.

At block 408, the detector, such as detector 214, determines whether the file that is being accessed is protected with a modified header. In certain embodiments, the detector issues an interrupt to temporarily prevent the file from being accessed. The interrupt can occur before the detector 214 determines whether the file that is being accessed is protected with a modified header or after the detector 214 determines whether the file has a modified header. The detector inspects the header of the file that is being accessed to identify the various applications or files that can access the file.

At block 410, the detector 214 determines whether the application that is attempting to access the file matches any of the identified applications or files listed in the header. For example, the detector 214 identifies the application type or the file type of the malicious application attempting to access the protected file. Upon the detector 214 determining that the malicious application is not listed in the header of the file, the detector 214 denies the malicious application access to the file. As a result, even if a brute force attack, such as the malicious application manages to break through and crack a user's credential associated with the protected file, when the brute force program that attempts to open the protected file the detector determines that the malicious application is not a pre-approved application, and thereby prevents the application from opening, regardless of the malicious application cracking the user authentication parameters.

It is noted that the malicious application can attempt to access a program on the electronic device 210 instead of a file. Similarly, it is noted that if the malicious application is included in the header, then the detector 214 grants permission for the malicious application to access the file.

Figure 5:
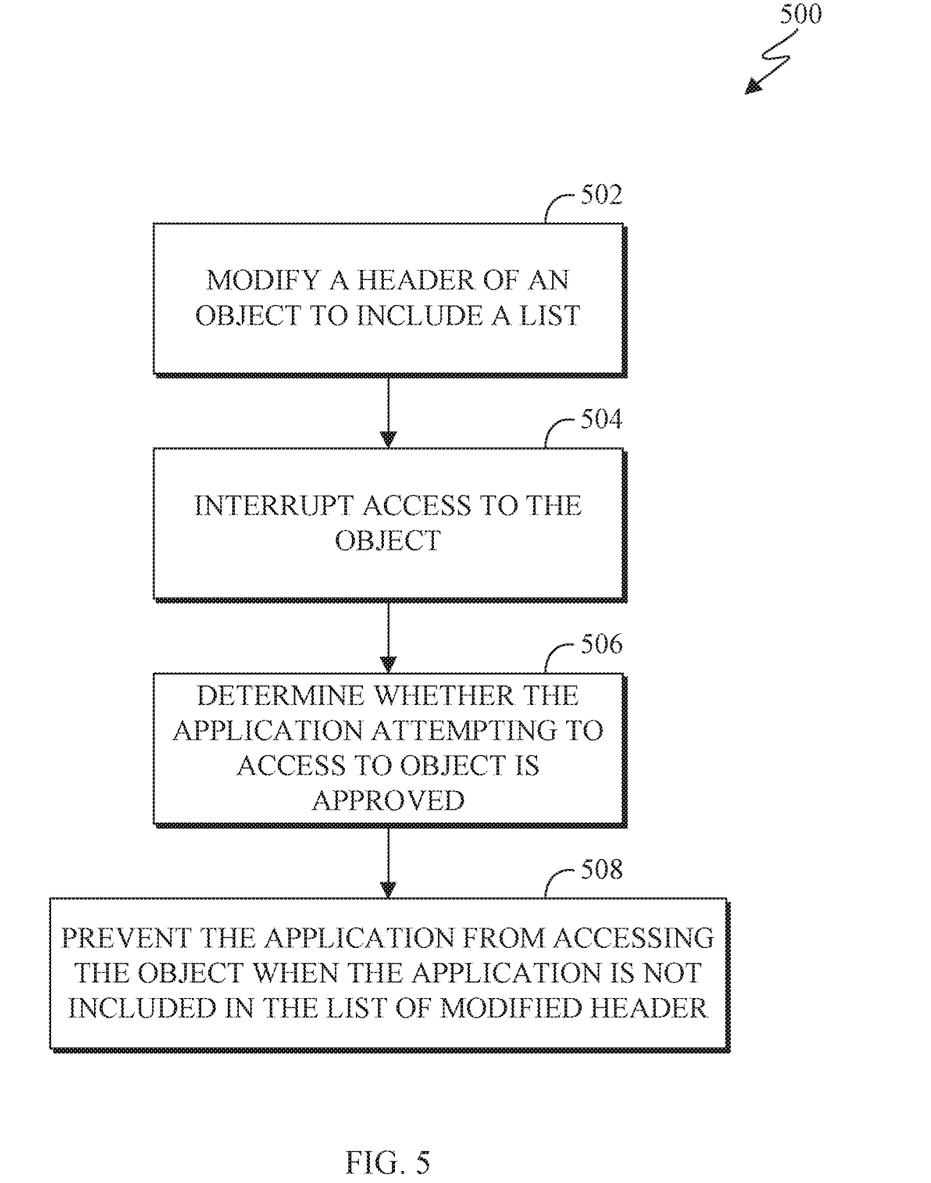
FIG. 5 illustrates an example method for protecting data according to this disclosure.

FIG. 5 illustrates an example method for protecting data according to this disclosure. In certain embodiments, the steps in FIG. 5 can be performed by electronic device 210, in particular the stamper 212 and the detector 214, as shown in FIG. 2A.

At step 502, the electronic device 210 modifies a header of an object based on a list. The indicated object is a file or a program that a user selected to protect. The list includes files and applications that are known to be valid, such that any application or file included in the list can access the object. The header of the object is altered to include the list. In certain embodiments, the header of the application is then encrypted. In certain embodiments, the header is marked as read only to prevent any later modifications the header. In certain embodiments, the modified header is encrypted and embedded into the header of the object.

At step 504, in response to an application attempting to access the object, the electronic device 210 issues an interrupt to temporarily prevent access to the object. The interrupt is issued to provide the electronic device a period of time to determine whether to allow the application access to the object. In certain embodiments, the duration of the interrupt is a predetermined period of time. In certain embodiments, the interrupt is lifted by the electronic device 210 only after the determination is made that the application is approved to access the object.

At step 506, the electronic device 210 determines whether the application that is attempting to access the object is approved. The determination is based on identifying at least one application or file included in the list of the modified header that corresponds to the application. In certain embodiments, the electronic device 210 identifies a parameter of the application that is at least one of an application type or a file type as well as analyzing the modified header of the object to ascertain whether that parameter of the application is identified in the modified header of the object.

At step 508, when the electronic device 210 determines that the application is not identified in the modified header, the electronic device 210 prevents the application from accessing the object. In certain embodiments, the electronic device can generate a report that indicates a non-approved application attempted to access the object, and transmit the report. In certain embodiments, the report can be transmitted to a network administrator. In certain embodiments, the report can be transmitted to a user of the electronic device 210.

In certain embodiments, the electronic device 210 allows the application to access the object when it is determined that the application is approved. The application is approved to access the object when the electronic device matches information of the application with information within the modified header. For example, application matches the information within the modified header when the obtained information includes a type of application that corresponds to the application. In another example, application matches the information within the modified header when the obtained information includes a type of file that corresponds to the application.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for protecting data, the method comprising:
    modifying a header of a file to include a list of one or more applications;
    encrypting the header with a read-only format to protect the file against brute force attacks;
    responsive to an application attempting to access the file, interrupting access to the file;
    determining whether the application that is attempting to access the file is approved based on identifying at least one application included in the list of the modified header that corresponds to the application, wherein the determining of whether the file is approved comprises:
        identifying a parameter of the application that is at least one of an application type; and
        analyzing the modified header of the file to ascertain whether the parameter of the application is identified in the modified header; and
    preventing the application from accessing the file when it is determined that the parameter is not included in the list of the modified header; and
    generating a notification to notify a user that a non-approved application is attempting to access the file.

2. The method of claim 1, further comprising allowing the application to access the file when it is determined that the application is approved based on the application matching at least one application within the list included in the modified header.

3. The method of claim 2, wherein the application matches a portion of the list of applications within the modified header when:
    the list includes a type of application that corresponds to the application.

4. The method of claim 1, wherein preventing the application from accessing the file, further comprises:
    generating a report that indicates one or more non-approved application attempted to access the file; and
    transmitting the generated report to a predetermined device.

5. The method of claim 1, wherein modifying the header of the file comprises:
    altering the header of the file to include the list, wherein the altered header provides an indication to allow access to the file when the application attempting to access the file matches an item within the list of the modified header.

6. An electronic device comprising:
    a memory configured to store an object; and
    a processor configured to:
        modify a header of the object to include a list of applications or files using a stamper, the stamper configured to receive a user input; encrypt the header;
        responsive to an application attempting to access the object, interrupt access to the object;
        determine whether the application that is attempting to access the object is approved using a detector, based on identifying via the detector at least one application or file included in the list of applications or files of the modified header that corresponds to the application, wherein the determining of whether the application that is attempting to access the object is approved comprises:
            identifying a parameter of the application that is at least one of an application type or a file type; and
            analyzing the modified header of the object to ascertain whether the parameter of the application is identified in the modified header;
        prevent the application from accessing the object when it is determined that the parameter is not included in the list of the modified header; and
        generate a notification to notify a user that a non-approved application is attempting to access the file.

7. The electronic device of claim 6, wherein the processor is further configured to allow the application to access the object when it is determined that the application is approved, based on the application matching at least one application or file within the list included in the modified header.

8. The electronic device of claim 7, wherein the processor is configured to determine that the application matches a portion of the list of applications or files within the modified header when:
the list includes a type of application that corresponds to the application, or
the list includes a type of file that corresponds to the application.

9. The electronic device of claim 6, wherein:
to prevent the application from accessing the object, the processor is further configured to generate a report that indicates a non-approved application attempted to access the object; and
the electronic device further comprises a communication unit configured to transmit the generated report to a predetermined device.

10. The electronic device of claim 6, wherein the object is at least one of a file or an application.

11. The electronic device of claim 6, wherein the processor is further configured to:
alter the header of the object to include the list, wherein the altered header provides an indication to allow access to the object when the application attempting to access the object matches items within the list of the modified header; and
encrypt the header with a read-only format to protect the object against brute force attacks.

12. A non-transitory computer readable medium embodying a computer program, the computer program comprising computer readable program code that when executed by a processor of an electronic device causes processor to:
modify a header of a file to include a list of one or more applications;
encrypt the header;
responsive to an application attempting to access the file, interrupt access to the file;
determine whether the application that is attempting to access the file is approved, based on identifying at least one application included in the list of the modified header that corresponds to the application, wherein the determining of whether the file is approved comprises:
identifying a parameter of the application that is at least one of an application type; and
analyzing the modified header of the file to ascertain whether the parameter of the application is identified in the modified header;
prevent the application from accessing the file when it is determined that the parameter is not included in the list of the modified header; and
generate a notification to notify a user that a non-approved application is attempting to access the file.

13. The non-transitory computer readable medium of claim 12, further comprising program code that, when executed at the processor, causes the processor to allow the application to access the file when it is determined that the application is approved, based on the application matching at least one application within the list included in the modified header.

14. The non-transitory computer readable medium of claim 13, further comprising program code that, when executed at the processor, causes the processor to determine that the application matches a portion of the list of applications within the modified header when:
the list includes a type of application that corresponds to the application.

15. The non-transitory computer readable medium of claim 12, wherein to prevent the application from accessing the file, the computer readable medium further comprising program code that, when executed at the processor, causes the processor to:
generate a report that indicates one or more non-approved applications attempted to access the file; and
transmit the generated report to a predetermined device.

16. The non-transitory computer readable medium of claim 12, wherein the computer readable medium further comprising program code that, when executed at the processor, causes the processor to:
alter the header of the file to include the list, wherein the altered header provides an indication to allow access to the file when the application attempting to access the file matches items within the list of the modified header; and
encrypt the header with a read-only format to protect against brute force attacks.

17. The non-transitory computer readable medium of claim 12, the computer readable medium further comprising program code that, when executed at the processor, causes the processor to:
modify the header of the file in response to a user input using a stamper.

* * * * *